Oct. 3, 1944. A. W. EVANS 2,359,307
HOOK FOR STUMP CLEARANCE
Filed Aug. 20, 1942
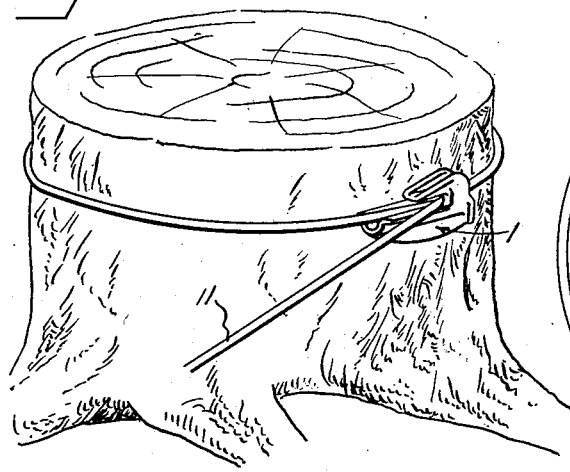
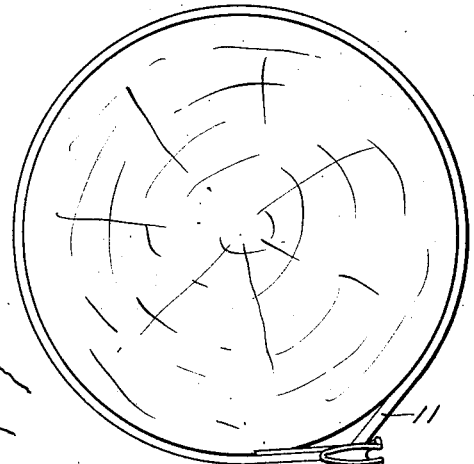
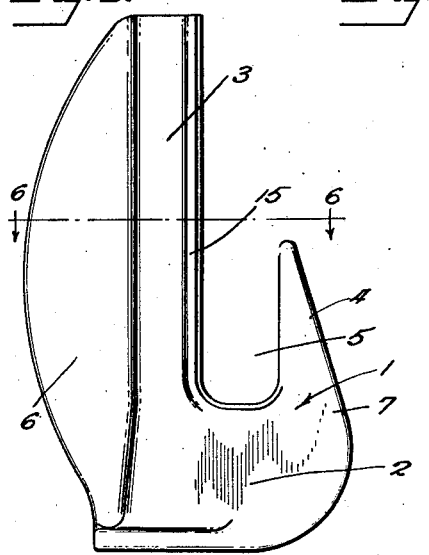
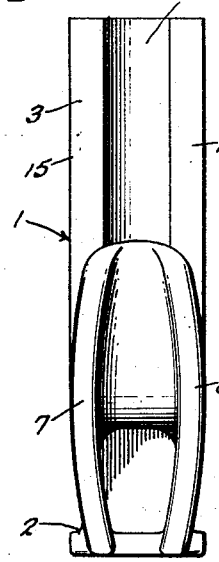
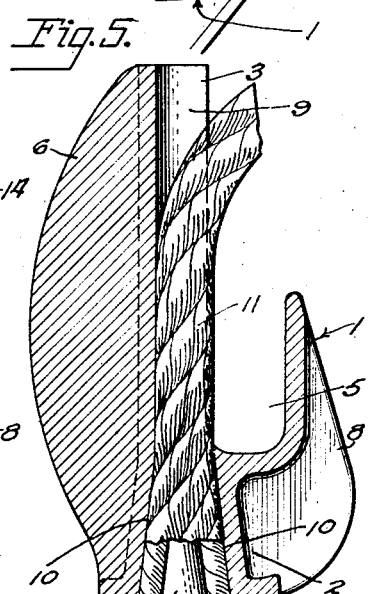
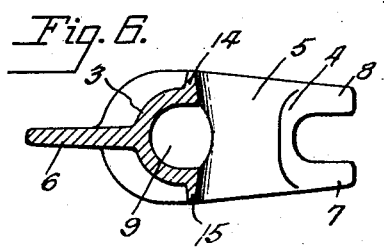
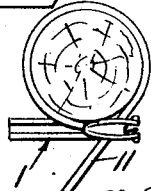
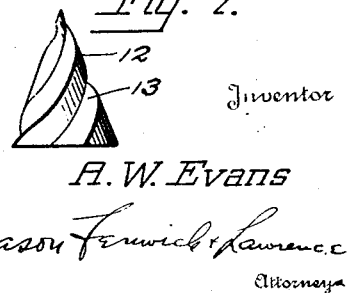
Inventor
A. W. Evans
By Mason Fenwick & Lawrence
Attorneys Patented Oct. 3, 1944

2,359,307

UNITED STATES PATENT OFFICE 2,359,307

HOOK FOR STUMP CLEARANCE

Alfred W. Evans, Gloucester, Va.

Application August 20, 1942, Serial No. 455,543

5 Claims. (Cl. 294—74)

This invention relates to a stump clearing hook of the type employed in forming a cable hitch about a stump, for the purpose of pulling the stump.

One of the objects of the invention is the provision of a hook, the construction of which is such as to avoid causing sharp bends in the cable against the hook under the stress of power application, which would cause the strands of the cable to break against the hook.

Another object of the invention is to provide a hook of the type described, having means for causing the hook to bite into the wood as the pulling power is applied to the cable, thereby causing the hook to anchor itself to the stump and to prevent the hitch from slipping over the top of the stump as the latter tilts toward the direction of pull.

A further object of the invention is the provision of a stump clearing hook having a cable socket extending therethrough, outwardly flared toward the base of the hook, within which the end of the cable is expanded and secured by being frictionally cramped against the walls of said socket by a wedge, whereby quick re-connection of the hook with an intact portion of the cable may be made, in the event of breakage of the cable.

Still another object of the invention is to construct the stump clearing hook with a shank longitudinally open toward the bight of the hook so that in the case of small stumps, the cable can issue from the open side of the shank in a smooth curve conforming to the circumference of the stump which it encompasses, instead of being constrained to follow the shank to its end and then bend sharply angularly about the end of the shank in order to reach the circumference of the stump.

Other objects of the invention will appear as the following description of a preferred and practical embodiment thereof proceeds.

In the drawing which accompanies and forms a part of the following specification and throughout the several figures of which the same reference characters have been employed to denote identical parts:

Figure 1 is a perspective view of a stump with a cable hitch thereabout, the hook being shown in its initial position;

Figure 2 is a cross-section, the cable hitch being shown in the same position as in Figure 1;

Figure 3 is a side elevation of the subject hook;

Figure 4 is an end elevation viewed from the bight side of the hook;

Figure 5 is a vertical side section through the hook;

Figure 6 is a cross-section taken along the line 6—6 of Figure 3;

Figure 7 is a view in elevation of the wedge;

Figure 8 is a cross-section showing a cable hitch embodying the hook of the present invention applied to a relatively small stump.

Referring now in detail to the several figures, the hook 1 comprises a massive metallic body consisting of a base 2, shank 3 and upper end 4, integrally related and so disposed as to form a bight 5, through which the cable freely passes. The shank is reinforced by an integral web 6, and the base 2 and free end 4 are stiffened by means of spaced webs 7 and 8.

The shank 3 has a longitudinal bore 9 and that side which faces the bight of the hook is open longitudinally down to a point approximately as far as the bottom of the bight 5. The bore of the shank 3 is continued through the base of the hook in the form of a downwardly tapered socket 10, which opens in the bottom of the hook.

In securing the cable 11 to the hook, said cable is passed through the bore 9 and socket 10, the strands at the end of the cable being then untwisted or opened throughout an extent substantially equal to the length of the socket 10 and a wedge 12, best shown in Figure 7, is inserted in the open end of the cable substantially axially thereof. The thus expanded end of the cable is then drawn upwardly into the socket 10 and the wedge 12 driven tightly in place. The wedge may be plain or formed with spiral corrugations 13, as shown, to receive the separated strands at the end of the cable.

This means of securing the cable to the hook is an improvement over the customary expedient of pouring molten babbitt between the strands, since re-connection of the hook with an intact part of the cable, in the event of breakage of the cable, may be quickly made wtihout loss of time necessary for melting and pouring the babbitt.

In pulling a stump it is customary to hitch the cable around the stump and through the hook, in the manner shown in Figures 1 and 2, with the hook so placed that the direction of power application is tangential to the circumference of the stump. It will be observed that when the hook and cable are in this relation to the stump the cable passes straight through the hook without being bent or deflected against the hook so that there will be no tendency of the hook to break or cut the cable. The parts are in this position at the beginning of the pulling operation when the roots of the stump are intact in the ground and the stump opposes the maximum load resistance to being moved. The first effect of the application of power to the cable is to twist the stump. After the stump has moved in a circumferential direction the least amount, relative to the ground, the force of its resistance drops off enormously, diminishing to one-fourth or less of the original resistance. As the stump begins to twist circumferentially, the hook 1 moves to the leftward, as viewed in Figure 2, bearing against the cable and putting an angle of deflection therein so that the direction of pull begins to approach the radial direction of the stump. However, as has been stated, when this deflection of the cable against the hook begins to take place, the resistance load has already fallen off to a small fraction of its original value, so that it is insufficient to cut or damage the cable at the point of its deflection against the hook.

As the hook 1, moving leftward, approaches closer to the middle of the arc of the stump circumference which faces the direction of pull, the stump begins to tilt forwardly. Ordinarily, this would cause the hitch to slip off over the cut face of the stump. A common expedient to prevent this is for a laborer to chop a circumferential channel about the stump before the hitch is first put in place, and to seat the hitch in this channel. This is a time-consuming operation, the cost of which probably equals that of the rest of the stump removing operation. The necessity of providing this circumferential channel is avoided in the present invention through the provision along the lateral edges of the shank 3 of the hook of the outwardly extending flanges 14 and 15, only one of which is at a time effective, depending upon the position of the hook. These flanges bite into the wood as the cable tightens against the stump under power, anchoring the hook fixedly with respect to the stump, and the harder the pull, the deeper the flanges 14 will bite in. With the hook 1 held fixedly with respect to the stump, it is impossible for any part of the hitch to slip from the stump, regardless of how far forwardly it may tilt in the course of its removal.

A hook having the purpose of the present invention must, of course, be exceedingly strong and rigid and for a given sized hook it must have a shank 3 of certain length to provide for an adequate reinforcing rib 6. The length of the shank 3 is such that when the hitch is placed around the largest sized stumps for which the hook is designed, the upper end of the shank 3 will lie substantially flush with the circumference of the stump, as shown in Figures 1 and 2, so that the cable 11 emanating from the end of the shank will extend therefrom in a smooth curve coinciding with the surface of the stump. In this case there will be no angular deflection of the cable at the end of the shank, so that there will be no tendency of the cable to break at this point. If the same hook were employed with a stump so small in circumference that the upper end of the hook projects away from the surface of the stump, as shown in Figure 8, the cable emanating from the end of the shank would be angularly deflected against the end of the shank and toward the small circumference of the stump, creating a point in the cable at which the end of the shank would dig into the cable under tension, with the possibility of breaking the cable. The longitudinal opening 9 in the shank prevents this. Said opening is wide enough to permit the cable to move laterally out of the bore 9, so that when the cable is hitched about a stump of relatively small circumference it can issue laterally from the opening 9 in a smooth curve conforming to the circumference of the stump, as is indicated in Figure 8, thus avoiding any point of sharp angular deflection where the risk of potential breakage might reside.

While I have in the above description disclosed what I believe to be a preferred and practical embodiment of the invention, it will be understood to those skilled in the art that the specific details of construction as shown and described are by way of example, and not to be construed as limiting the scope of the invention as defined in the appended claims.

What I claim is:

1. Hook comprising an integral base, shank and free end portion for the running part of a cable hitch, said shank having a cable receiving bore, a cable extending into said bore and anchored at its end to said hook, said shank having longitudinally disposed flanges extending laterally therefrom on opposite sides.

2. Hook comprising an integral base, shank and free end portion correlated to form a bight for the running part of a cable hitch, said shank having a cable receiving bore, a cable extending into said bore and anchored at its end to said hook, said shank having a longitudinal flange on each side extending laterally therethrough.

3. Hook comprising an integral base, shank and free end portion correlated to form a bight for the running part of a cable hitch, said shank having a cable receiving bore, a cable extending into said bore and anchored at its end to said hook at a point remote from the top of said shank, the latter having a longitudinal slot extending to the top of said shank and opening toward the bight of said hook of such width as to permit lateral excursion of said cable from said slot, said shank having longitudinally disposed flanges extending laterally therefrom on opposite sides.

4. Hook comprising an integral base, shank and free end portions correlated to form a bight for the running part of a cable hitch, said shank having a bore extending longitudinally therethrough and continuing through said base, said bore within said base being flared toward the exterior of said base, a cable extending through said bore, a wedge buried in the end of said cable within the expanded portion of said bore cramping the strands of said cable into tight engagement with the walls of said expanded portion, said shank having longitudinally disposed flanges extending laterally therefrom on opposite sides.

5. Hook comprising an integral base, shank and free end portion correlated to form a bight for the running part of a cable hitch, said shank having a bore extending longitudinally therethrough and continuing through the base, said bore within said base being flared toward the exterior of said base, a cable extending through said bore and a wedge buried in the end of said cable within the expanded portion of said bore cramping the strands of said cable into tight engagement with the wall of said expanded portion, said shank having a longitudinal slot extending to the top of said shank and opening toward the bight of said hook of such width as to permit lateral excursion of said cable from said slot, said shank having longitudinally disposed flanges extending laterally therefrom at opposite sides of said slot.

ALFRED W. EVANS.